M. STEFANKA.
VEHICLE BRAKE SHOE.
APPLICATION FILED JUNE 3, 1914.
1,130,939.
Patented Mar. 9, 1915.
2 SHEETS—SHEET 1.
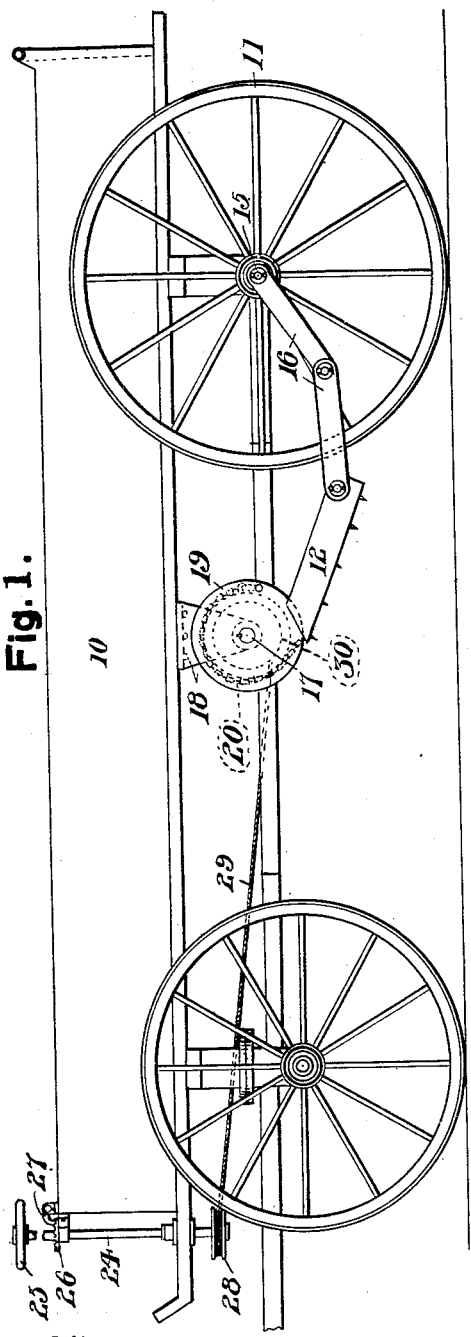
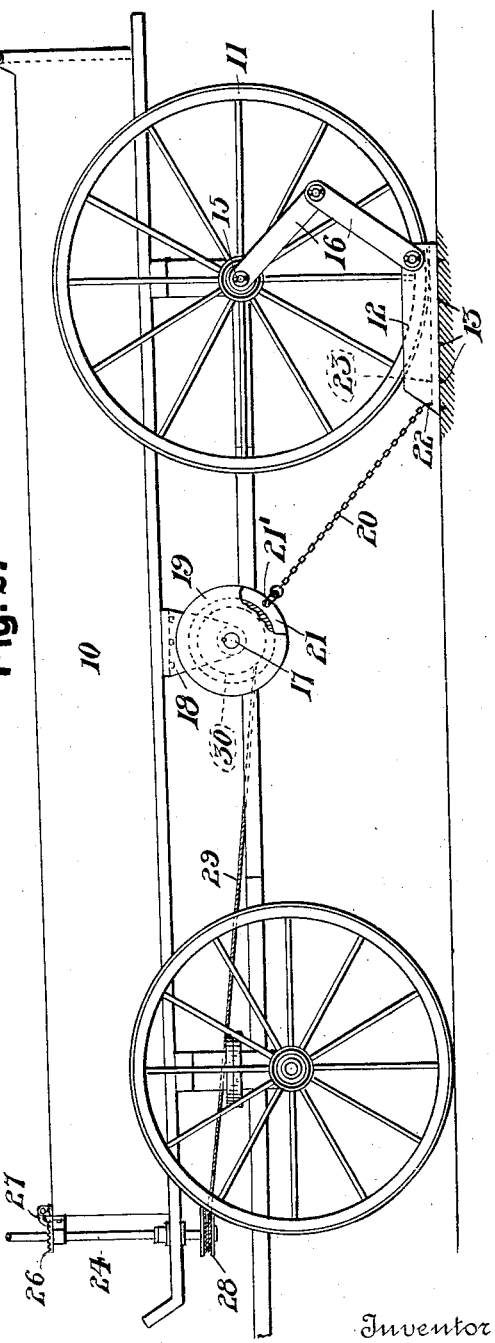
Witnesses
Inventor
Michael Stefanka
By A. M. Wilson
Attorney M. STEFANKA.
VEHICLE BRAKE SHOE.
APPLICATION FILED JUNE 3, 1914.
1,130,939.
Patented Mar. 9, 1915.
2 SHEETS—SHEET 2.
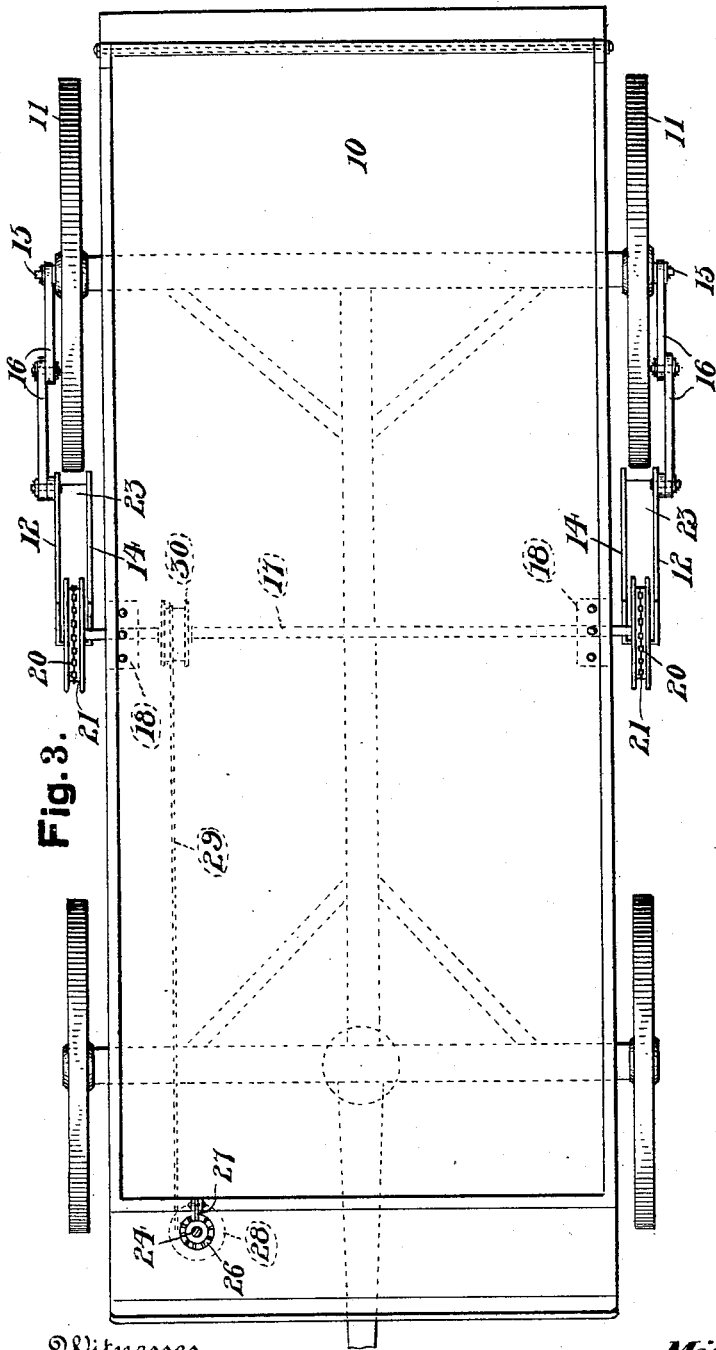
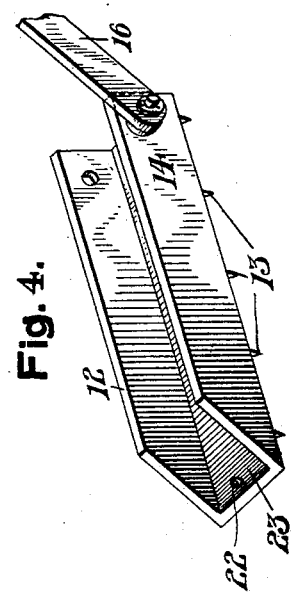

UNITED STATES PATENT OFFICE.

MICHAEL STEFANKA, OF CLEVELAND, OHIO.

VEHICLE BRAKE-SHOE.

1,130,939.  Specification of Letters Patent.  Patented Mar. 9, 1915.

Application filed June 3, 1914. Serial No. 842,680.

*To all whom it may concern:*

Be it known that I, MICHAEL STEFANKA, a subject of the Emperor of Austria-Hungary, residing at Cleveland, in the county of Cuyahoga and State of Ohio, have invented certain new and useful Improvements in Vehicle Brake-Shoes, of which the following is a specification.

This invention relates to new and useful improvements in vehicle brake shoes.

The primary object of this invention is the provision of suspended calked brake shoes carried by a vehicle and operatively positioned with respect to the wheels thereof by mechanism positioned adjacent the driver's seat.

A further object is the provision of a brake wheel operable by the driver of the vehicle and whereby separate brake shoes may be lowered into position beneath the rear wheels and elevated to the inoperative positions at will.

A still further object is to provide a readily positioned brake shoe for service upon automobiles, wagons and other vehicles which is automatically positioned for use upon being released and is manually inoperatively positioned from the driver's seat.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—

Figure 1 is a side elevation of a vehicle provided with the present invention, the brake shoes being illustrated in their inoperative elevated positions. Fig. 2 is a similar view with the brake shoes positioned beneath the rear wheels of the vehicle, a portion of one of the winding drums being broken away. Fig. 3 is a top plan view thereof with the brake shoes positioned as shown in Fig. 1, and Fig. 4 is a perspective view of one of the brake shoes detached with the adjacent link member broken away.

Referring more in detail to the drawings, the vehicle 10 is illustrated as provided with the usual rear wheels 11 and with a separate brake shoe 12 adapted to be positioned beneath each one of said wheels.

The brake shoes 12 being formed of metal of substantially the shape of channel bars are provided with pointed calks 13 downwardly projecting from the lower face of the shoe and adapted to project into the road surface as illustrated in Fig. 2 when the shoe is positioned with a vehicle wheel mounted thereon.

The outer flange 14 of each shoe is pivotally linked to the adjacent projecting end 15 of the rear axle of the vehicle by means of two links 16 of substantially equal lengths, which links are pivoted together and to said hub and flange.

A shaft 17 is journaled transversely beneath the vehicle body by means of opposite brackets 18 and has winding drums 19 rigidly keyed to the opposite outer ends of said shaft. Each of said drums 19 has a chain 20 secured at one end thereof interiorly of the peripheral channel 21 of the drum upon bolts 21′ extending transversely of said channel and with its other end secured to an eye 22 at the forward end of the bottom plate 23 of the shoe upon its upper surface.

A brake shaft 24 is journaled forwardly of the vehicle having a brake wheel 25 secured to the top thereof and whereby the said shaft 24 may be revolved from the driver's seat of the vehicle. A circular toothed rack 26 being carried by the said shaft 24 adapted to be engaged by a pivoted retaining pawl 27 carried by the vehicle is adapted to retain the brake shaft in any desired position.

A pulley wheel 28 is rigidly secured to the lower end of the shaft 24 and has one end of the cord or rope 29 secured thereto, while the opposite or rear end of said rope is secured to the periphery of a sheave 30 rigidly mounted upon the shaft 17. The points upon the pulley and sheave to which the ends of the rope 29 are attached are such as to provide a revolving of the shaft 17 and the drums 19 to wind up the chains 20 upon said drums whenever the brake wheel is turned for winding the rope 29 upon the pulley 28. To accomplish such results it will be seen that when the brake shoes are operatively positioned beneath the rear wheels of the vehicle as shown in Fig. 2, the rope 29 must be partially wound upon the sheave 30 and then a winding of the forward end of the rope upon the pulley 29 will result in unwinding the rearward end of the rope from the sheave 30 and will revolve the shaft 17 and its drums 19 for winding up the brake shoe chains 20 to the positions illustrated in Fig. 1. It will be noted however that for more easily elevating the brake shoes, it is desired to first back the vehicle off from the shoe.

When the brake shoes are elevated as illustrated in Fig. 1, it is only necessary to release the pawl 27 from its engagement with the teeth of the rack 26 which will allow the brake shoes by means of their own weight to descend by unwinding the chains 20 which results in a slight winding of the rope 29 upon the sheave 30, while the shoes will automatically position themselves directly forward of the rear wheels, which wheels will then upon a slight forward motion position themselves upon the said shoes. It will be seen that the links 16 allow a free operative movement to the connected shoes to hold the same sufficiently rigid in connection with the chains 20 to insure an accurate positioning thereof as well as direct forward movement when dragged along by the vehicle.

While the forms of the invention herein shown and described are what are believed to be preferable embodiments thereof, it is nevertheless to be understood that minor changes may be made in the form, proportion and details of construction without departing from the spirit and scope of the invention as set forth in the appended claim.

What I claim as new is:—

A brake of the class described comprising a brake shoe having upstanding lateral flanges beveled at their forward ends and downwardly projecting spurs, a link connected with the axle of a vehicle and a second link connected with the free end of the first link and with the rear end of the brake shoe, a winding mechanism and a flexible connection between the shoe and the winding mechanism, the lengths of the links being such that when the shoe is in inoperative position, its rear end will be removed a sufficient distance from the rim of the adjacent wheel to prevent any interference between the members.

In testimony whereof I affix my signature in presence of two witnesses.

MICHAEL STEFANKA.

Witnesses:
M. SUST,
M. KLISH.

Copies of this patent may be obtained for five cents each, by addressing the "Commissioner of Patents, Washington, D. C."